US006234504B1

(12) United States Patent
Taylor

(10) Patent No.: US 6,234,504 B1
(45) Date of Patent: *May 22, 2001

(54) LEVEL PROPELLED WHEELCHAIR

(76) Inventor: William G. Taylor, 6612 Manor Hill, San Antonio, TX (US) 78257

( * ) Notice: Subject to any disclaimer, the term of this patent is extended or adjusted under 35 U.S.C. 154(b) by 0 days.

This patent is subject to a terminal disclaimer.

(21) Appl. No.: 09/509,088

(22) PCT Filed: Sep. 23, 1997

(86) PCT No.: PCT/US97/16854

§ 371 Date: Mar. 21, 2000

§ 102(e) Date: Mar. 21, 2000

(87) PCT Pub. No.: WO99/15397

PCT Pub. Date: Apr. 1, 1999

(51) Int. Cl.$^7$ ...................................................... B62M 1/99

(52) U.S. Cl. .................................... 280/250.1; 280/304.1; 280/DIG. 10; 297/DIG. 4

(58) Field of Search .................................... 280/236–238, 280/248, 249, 250.1, 253, 258; 297/DIG. 4

(56) References Cited

U.S. PATENT DOCUMENTS

| | | | | |
|---|---|---|---|---|
| 3,994,509 | * | 11/1976 | Schaeffer | 280/242 WC |
| 4,274,651 | * | 6/1981 | Dumont | 280/242 WC |
| 4,455,029 | * | 6/1984 | Taylor | 280/5.28 |
| 4,460,190 | * | 7/1984 | Spiess | 280/247 |
| 4,471,972 | * | 9/1984 | Young | 280/289 WC |
| 4,705,284 | * | 11/1987 | Stout | 280/242 WC |
| 4,865,344 | * | 9/1989 | Romero, Sr. et al. | 280/242 |
| 4,962,942 | * | 10/1990 | Barnett et al. | 280/5.28 |
| 5,007,655 | * | 4/1991 | Hanna | 280/250.1 |
| 5,236,398 | * | 8/1993 | Barnett | 474/149 |
| 5,322,312 | * | 6/1994 | Cammack | 280/244 |
| 5,439,240 | * | 8/1995 | Tichenor et al. | 280/250.1 |
| 5,465,989 | * | 11/1995 | Grove | 280/250 |
| 5,501,480 | * | 3/1996 | Ordelman et al. | 280/304.1 |
| 5,632,499 | * | 5/1997 | Hutcherson et al. | 280/246 |
| 5,826,897 | * | 10/1998 | Beard | 280/250.1 |
| 5,865,455 | * | 2/1999 | Taylor | 280/250.1 |
| 5,873,589 | * | 2/1999 | Hallett | 280/250.1 |

* cited by examiner

*Primary Examiner*—J. J. Swann
*Assistant Examiner*—L. Lum
(74) *Attorney, Agent, or Firm*—Jackson Walkers LLP

(57) ABSTRACT

A lever propelled wheelchair, the lever having two push levers attached to two front drive sprockets. The two levers propel the two main rear wheels of the wheelchairs through chains connecting the front sprockets to gear clusters mounted on the rear axles. Ratchet mechanisms allow each push lever to transmit power to the drive sprockets in either a forward or reverse direction. Derailers are mounted at each axle and are activated by a shifter mechanism mounted on the push levers. Brakes are mounted on the frame beside each wheel and activated by a hand break lever mounted on the push levers.

10 Claims, 13 Drawing Sheets

LEVEL PROPELLED WHEELCHAIR

BACKGROUND OF THE INVENTION

1. Field of the Invention

This invention relates to a user-propelled vehicle or wheelchair. More particularly, it relates to a wheelchair propelled by push levers connected to drive wheels through bicycle chains and variable ratio rear gear clusters.

2. Description of the Prior Art

Most wheelchair users have little or no functional use of their lower extremities, but have preserved normal upper body function. Accordingly, the conventional wheelchair requires the user to propel the chair by repetitively pushing on push-rims attached to the main wheels of the chair. The arm and shoulder motions that are required are undesirable because they utilize the small, relatively weak, muscles of the rotator cuff and ultimately lead to stress injury and degenerative arthritis of the shoulder joint. This is also an inefficient means of locomotion; providing only a one-to-one ratio of distance traveled for distanced pushed. It is, however, an ubiquitous and relatively simple machine that can be easily maintained. Several attempts have been made to improve on this standard with very limited success.

Several inventions employ the use of levers for the user to propel the chair. This is an improvement because it makes use of the larger and more powerful triceps and pectoral muscles, with reduced shoulder stress. Still, however, all of these devices have fallen short of success.

For example, U.S. Pat. No. 4,865,344 provides only one speed having one fixed gear ratio, and thereby forgoes the significant mechanical advantage gained by using a set of multiple gear ratios This machine also requires the user to steer with hand levers attached to the push levers, increasing the complexity of steering and propulsion movements.

U.S. Pat. No. 5,322,312 is another attempt to propel a wheelchair with a push lever. It also lacks sufficient mechanical advantage, having only one gear ratio. The use of a detachable skateboard device makes this machine unnecessarily complex, expensive, and difficult to maintain.

U.S. Pat. 5,209,506 is cumbersome in requiring the user to steer with handlebars which are simultaneously pushed and pulled to propel the chair. The linkage required to operate this machine is also too complex for easy care, and the position of the steering/push lever obstructs easy entry and exit of the chair.

U.S. Pat. No. 4,811,964 also uses push levers for power, but in a rowing motion. This machine would be difficult to steer, having a combined row-steer motion; it also has only one speed, and uses a complex system of pulleys and linkage, all of which serve to make it impractical.

U.S. Pat. No. 3,994,509 is another lever-driven machine that makes use of a very complex and expensive system of forward and reverse clutches. It also provides only a single forward speed, and has a very wide profile, to accommodate the wide-set wheels.

There are several inventions that use a set of bicycle pedals to turn a crank which, in turn, transfers power via a bicycle chain to either front or rear wheels. All of these hand-crank designs suffer from the fact that the hand cranking motion is extremely fatiguing. Further, they are too big and too heavy. The cranking/steering device obstructs entry and exit. These wheelchairs generally lack multiple gears and are difficult to steer while cranking. U.S. Pat. No. 4,720,117 is a typical example of this type of machine.

U.S. Pat. No. 5,362,081 is an attempt to adapt the mechanical advantage of multiple gear ratios to the standard wheelchair format. It does not, however, save the user from the repetitive motion injury and degenerative damage to the shoulder joints; and, in requiring the use of the user's smaller, weaker rotator cuff muscles, it is more fatiguing than a push lever driven machine. This particular model also requires the user to let go of the steering/drive wheel to shift gears.

OBJECTIVE OF THE INVENTION

It is the object of this invention to provide for, in a wheelchair of simple construction, an alternative means for manually powering the wheelchair which utilizes the strong shoulder and arm muscles of the wheelchair occupant while providing for a selection of gear options to drive the wheelchair in a forward or reverse motion.

SUMMARY OF THE INVENTION

Applicant provides for a wheelchair propulsion apparatus that improves a user's ability to propel a chair with less effort and greater speed over a longer duration. Compared to present wheelchair options, mechanics used in Applicant's wheelchair decrease the stress on shoulder joints and diminish the degenerative joint disease often accompanying prolonged wheelchair use.

Applicant's wheelchair is propelled through use of two push levers, which the user pushes forward utilizing triceps and pectoralis muscles. Ratchets attached to these levers allow the user to retract the levers to the start position with little resistance.

Power is transmitted from the push levers to drive sprockets through bicycle chains to the multi-speed rear wheels. Multiple gear ratios are made possible by shifting the drive chain to different size rear wheel sprockets with a derailer mechanism.

Turning is accomplished in the same manner that it is done with a standard wheelchair. One wheel is pushed more than the other, or a braking force is applied to one wheel while the other is pushed. Braking is accomplished effectively by using calliper brakes similar to those used on a typical bicycle.

This apparatus provides for a most efficient means of wheelchair propulsion, with significant physiological benefits to the user.

DETAILED DESCRIPTION OF THE INVENTION

Figure 1:
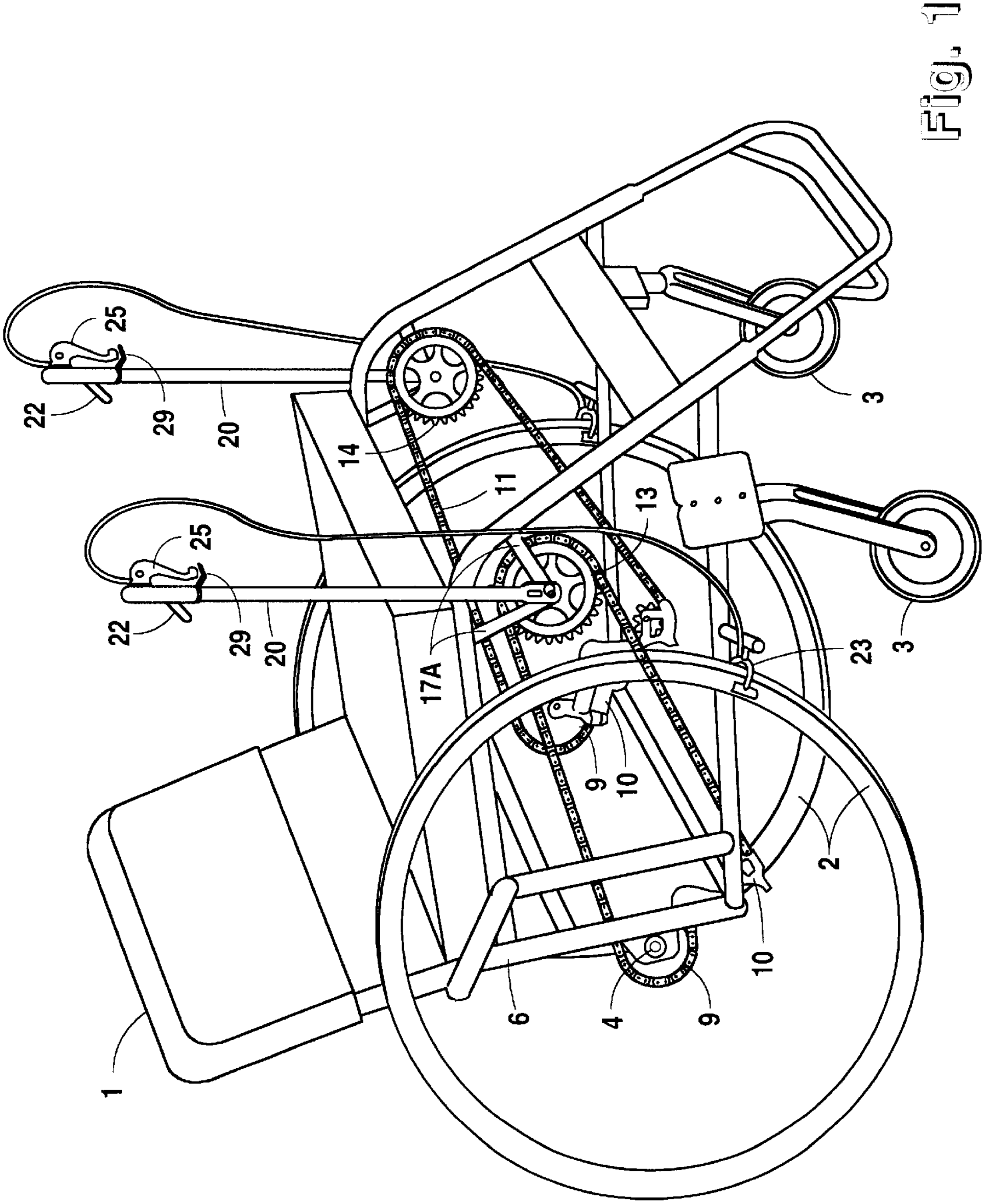
FIG. 1 is a right side view in elevation of the apparatus of this invention.

With reference to FIGS. 1–9, it is seen that wheelchair (1) has two large rear wheels (2) and two smaller front casters (3). The large rear wheels are typically mounted outboard of the wheelchair frame on rear axles (4). These rear axles are typically mounted in the left and right rear axle hubs (5) which are incorporated in the frame of the chair on the left and right rear frame uprights (6) below the level of the seat. The axles are supported in the hubs on inner (7) and outer (8) axle bearings. The rear wheels typically are attached to the axles such that each wheel and axle turns as a unit on the hub bearing.

Inboard of the left and right rear axle hubs, sprocket gear clusters (9) are affixed to their respective axles and turn with the axle-wheel units. The specific number of sprockets and the number of teeth on each sprocket of the gear cluster can be varied within the limitations of space and axle length.

Figure 2A:
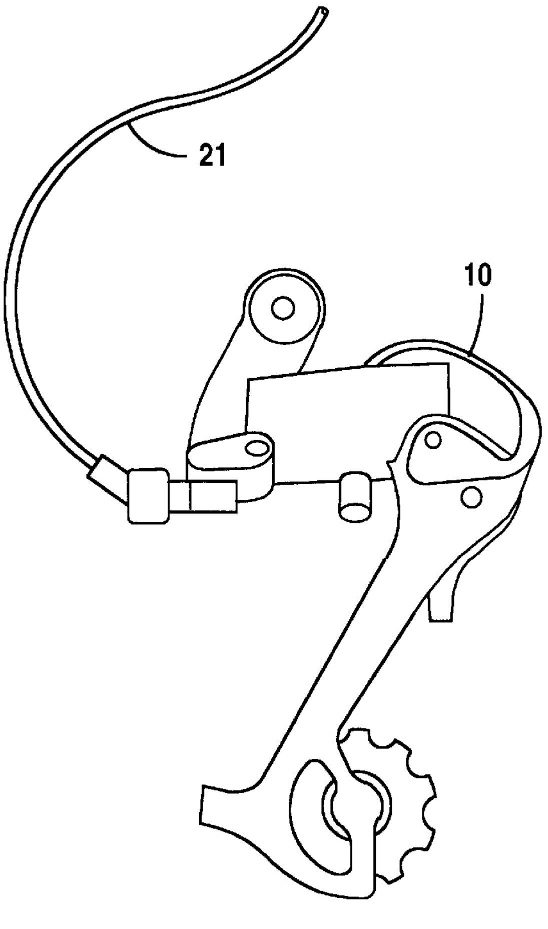
FIG. 2 is a view of left and right derailers showing them to be mirror images of each other.
Figure 2B:
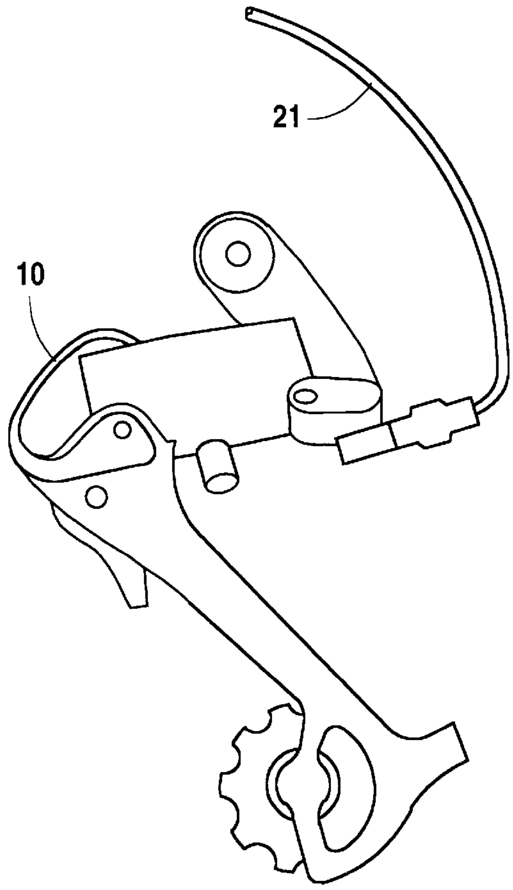
Figures 3A, 3B:
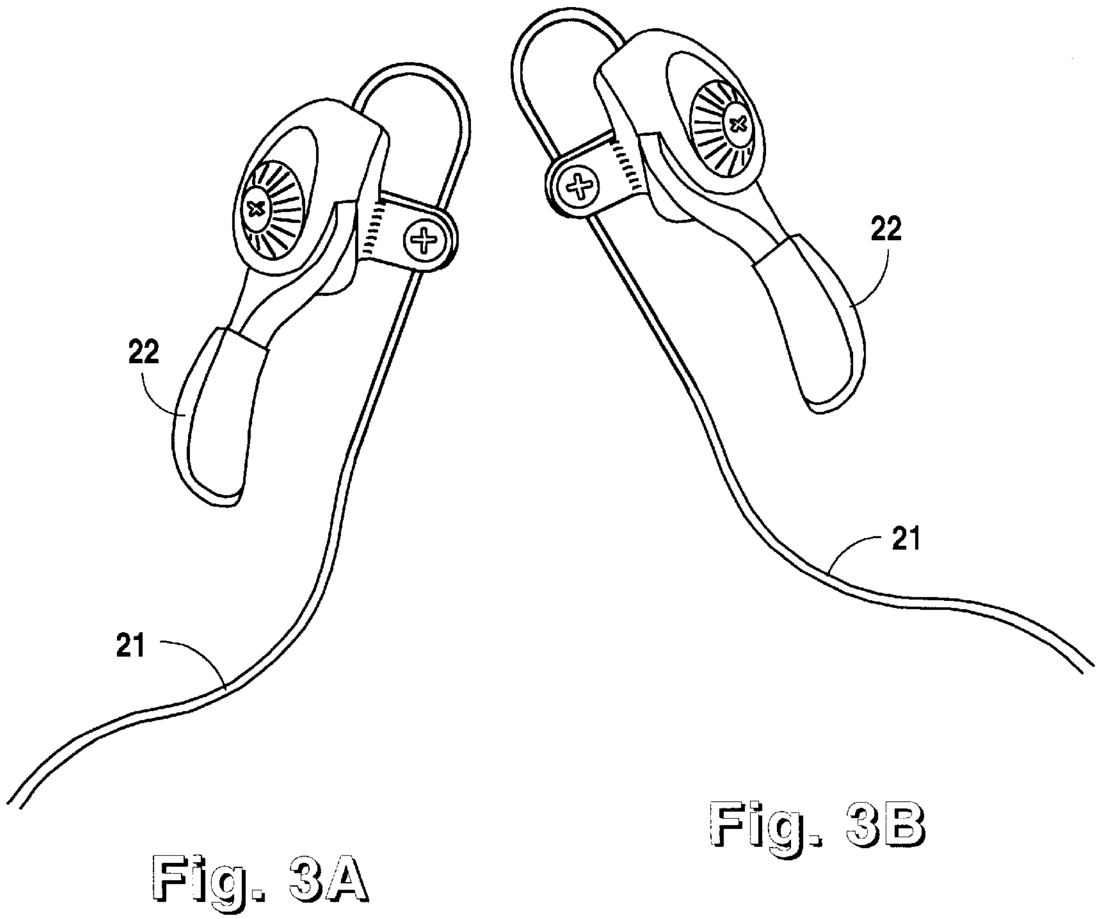
FIG. 3 is a view of left and right shifters showing them to be mirror images of each other.

With further reference to FIG. 2, derailers (10) are seen attached to the frame, usually above and behind each gear cluster to shift the left and right drive chains (11) between rear sprockets (12) of each sprocket gear cluster (9).

Each drive chain (11) is a multi-link, standard bicycle chain that rotates its gear cluster (and axle and wheel) when the corresponding front drive sprocket (13) is rotated by the user.

Figure 4:
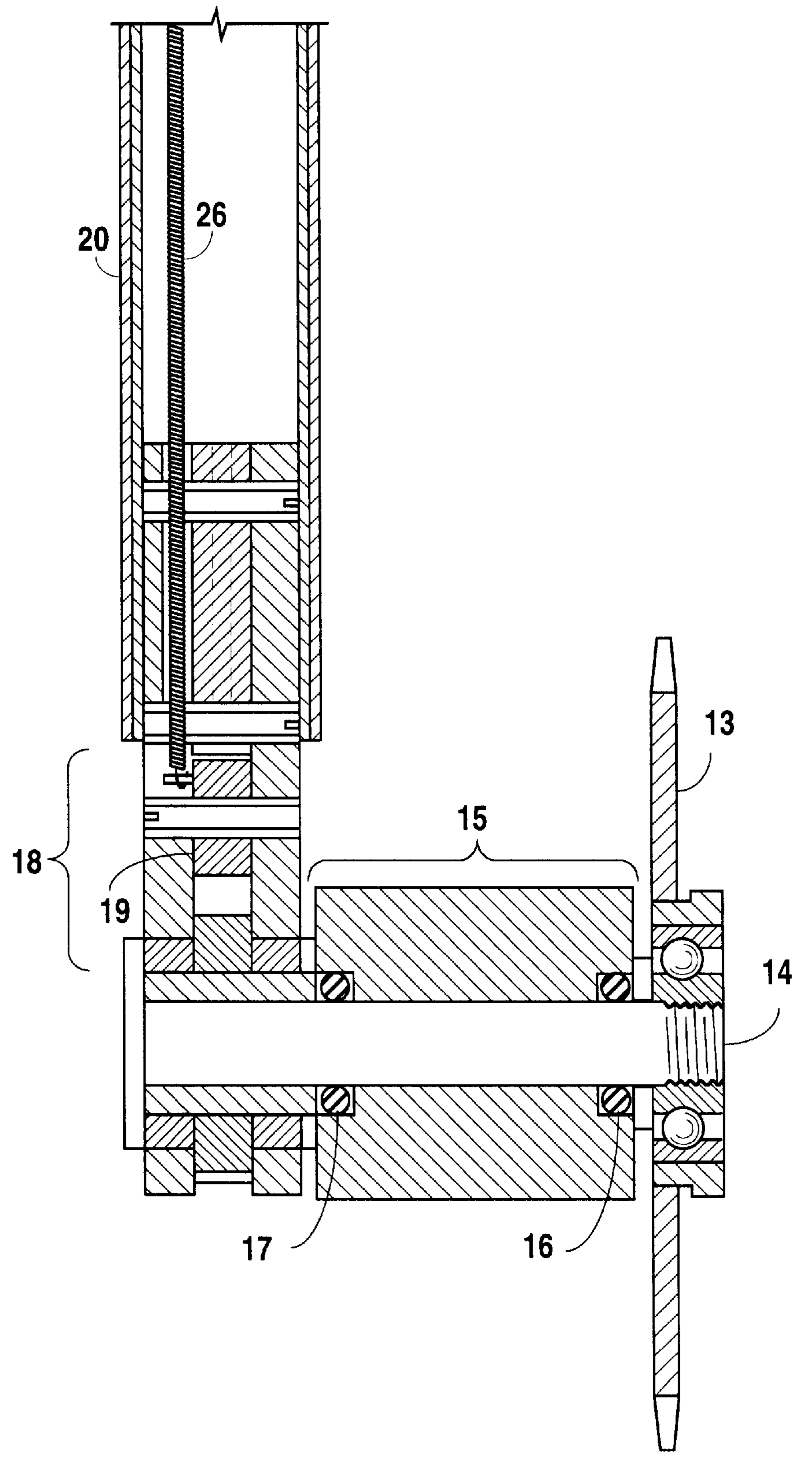
FIG. 4 is a cross section view of the front axle with its attached sprocket, bearing, hub, ratchet, and push lever.

With further reference to FIG. 4, it is seen that each front drive sprocket (13) is affixed to a front axle (14), which is supported in its front axle hub (15), on inner (16) and outer (17) bearings. The left and right front hubs are typically fixed to the frame of the chair below the seat level on struts (17A).

Outboard of the chair frame, a ratchet mechanism 918) is attached to each front axle. With further reference to FIGS. 5–7 and 10–13, it is seen that each ratchet can be selected to deliver a power stroke to drive the front drive sprocket in either the clockwise or counterclockwise direction by rotating the handgrip (28) at the upper end of the push-pull lever which, in turn, pulls up one of the two ratchet cables (26) that are connected through the inner hollow core of the push-pull lever to the ratchet selector (19), which moves up, thereby setting the ratchet for forward (FIGS. 6 and 12), neutral (FIGS. 5 and 11), or reverse (FIGS. 7 and 13) drive.

The rotating hand grips are kept in place by a spring-loaded ball assembly (30) incorporated in the push-pull lever adjacent to the hand grip such that the ball is pressed into one of three detents (30A, 30B, and 30C) in the hand grip corresponding to the neutral, or forward, or reverse position of the ratchet selector (19). The ratchets are attached to the removed ends of each of the two push-pull levers (20) that the user pushes straight forward to propel the chair forward when the ratchet selectors are set for forward motion. The user can move the chair backwards by setting the ratchets for reverse and pulling back on the push-pull levers.

Each derailer moves it drive chain between gear sprockets (12) when the shift cables (21) are tightened or relaxed. The user does this by pushing or pulling on the push-pull lever mounted shifter levers (22). These shifters are typically attached to the handles of each push lever so that the user can operate them with thumb pressure.

The derailer and shifter on the left side of the chair are typical of those commonly found on a ten-speed bicycle. The derailer and shifter on the right side of the chair are typically exactly backwards (mirror images) of those on the left side. This allows the user to perform analogous movements with each hand simultaneously to activate each derailer equally and to shift both left and right gears equally.

Each rear wheel has its own cable activated calliper brake (23) The callipers are typically mounted on the frame below the level of the ratches, and activated by a brake cable (24). The proximal end of each brake cable is attached to a left or right brake lever (25) which is mounted on the corresponding push-pull lever handle. The user squeezes the brake levers to apply a braking force to the rear wheels. Each wheel brake is operated independently, as is each rear drive wheel. Each push-pull lever is fitted with a pivotable retaining clip (29) to hold the brake lever in the compressed position, thereby maintaining the callipers tightly compressed to the wheel, thus functioning as a parking brake.

Sprocket shields (27) may be mounted above and in front of each front drive sprocket to protect the user's legs.

The rear axles are typically ½ inch in diameter in order to accept most currently produced wheelchair wheels. These wheels are secured to the drive axles in a manner that prevents them from turning independently from the rear axles.

Figure 5:
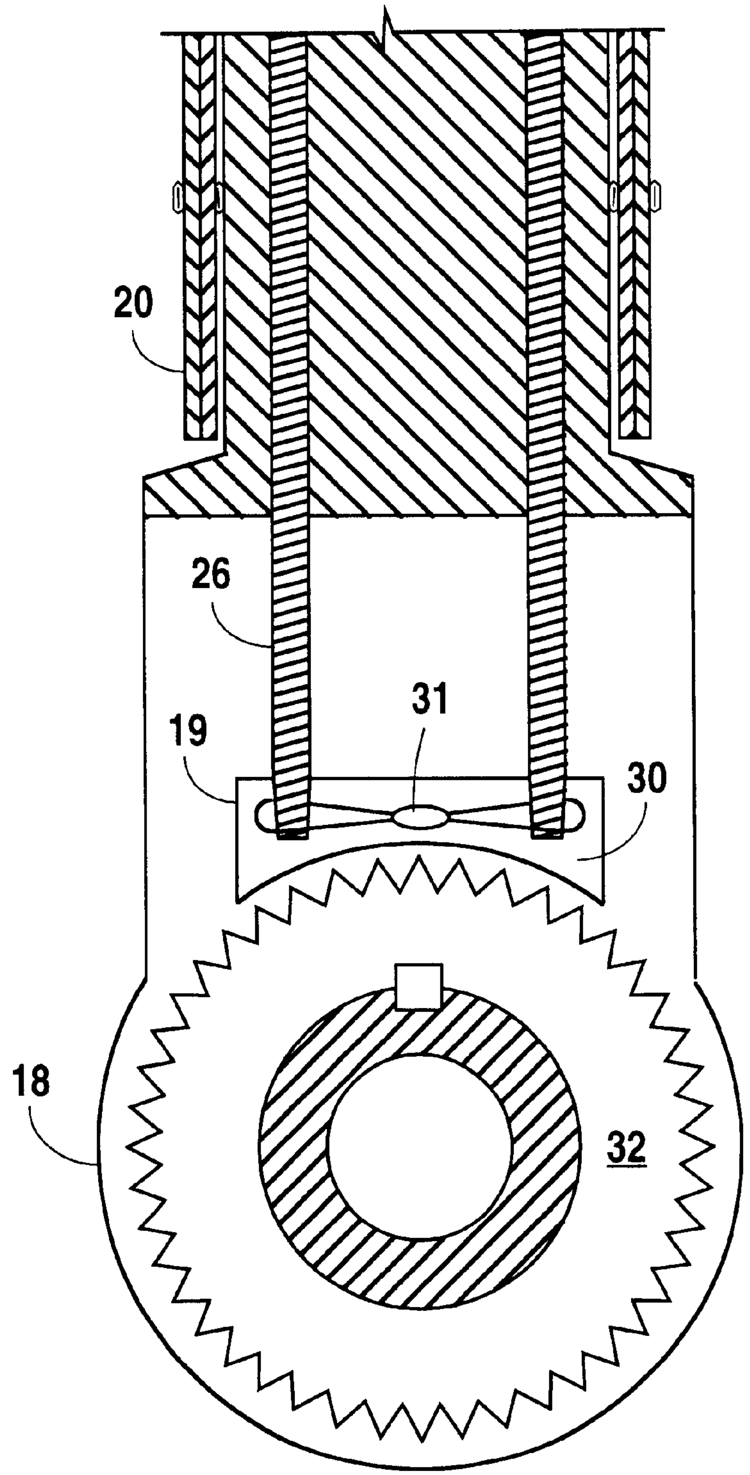
FIG. 5 is a cross section view of the ratchet mechanism showing the ratchet cables attached to the ratchet selector in the neutral position.
Figure 6:
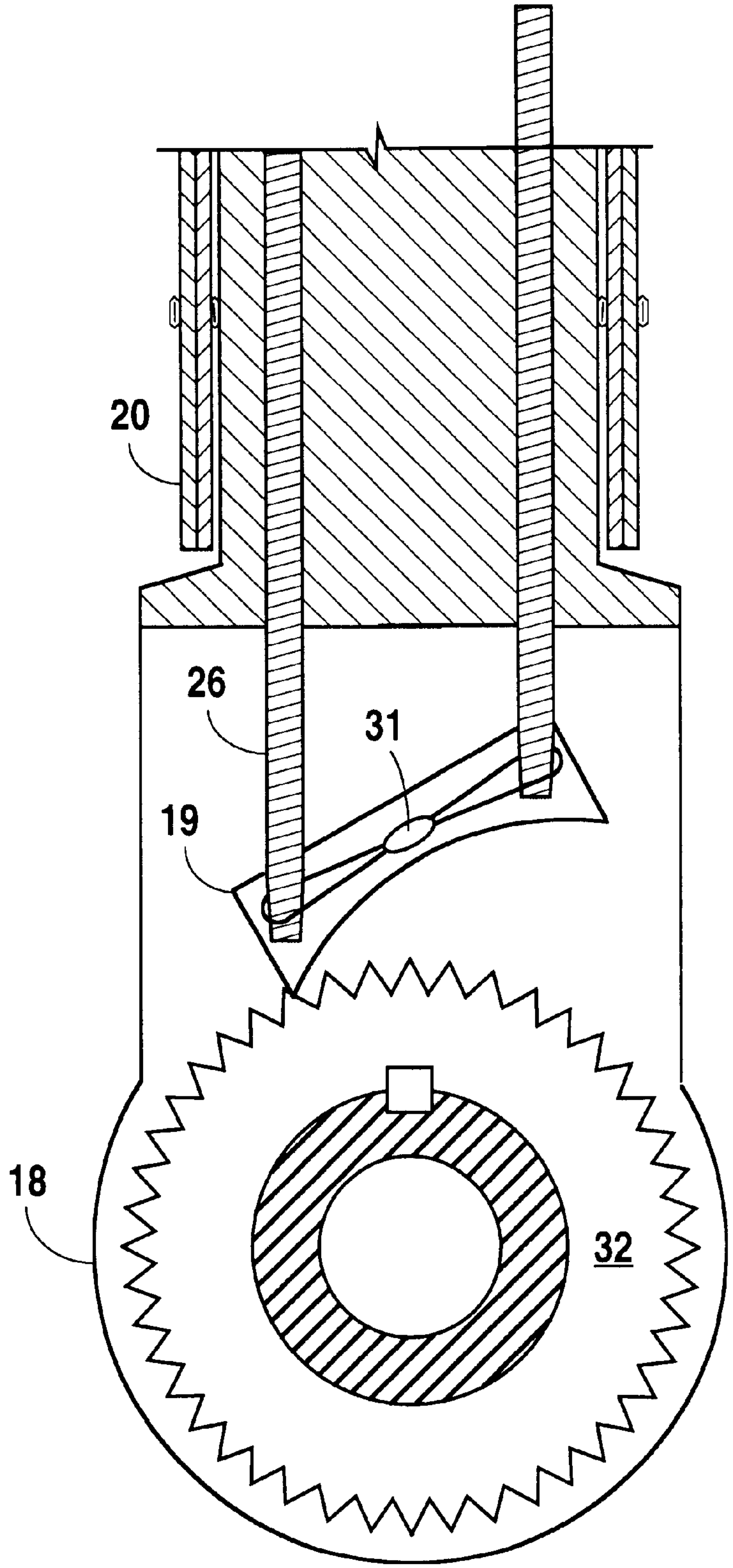
FIG. 6 is a cross section view of the right-side ratchet mechanism showing the ratchet cables attached to the ratchet selector, with the selector set in the forward position.
Figure 7:
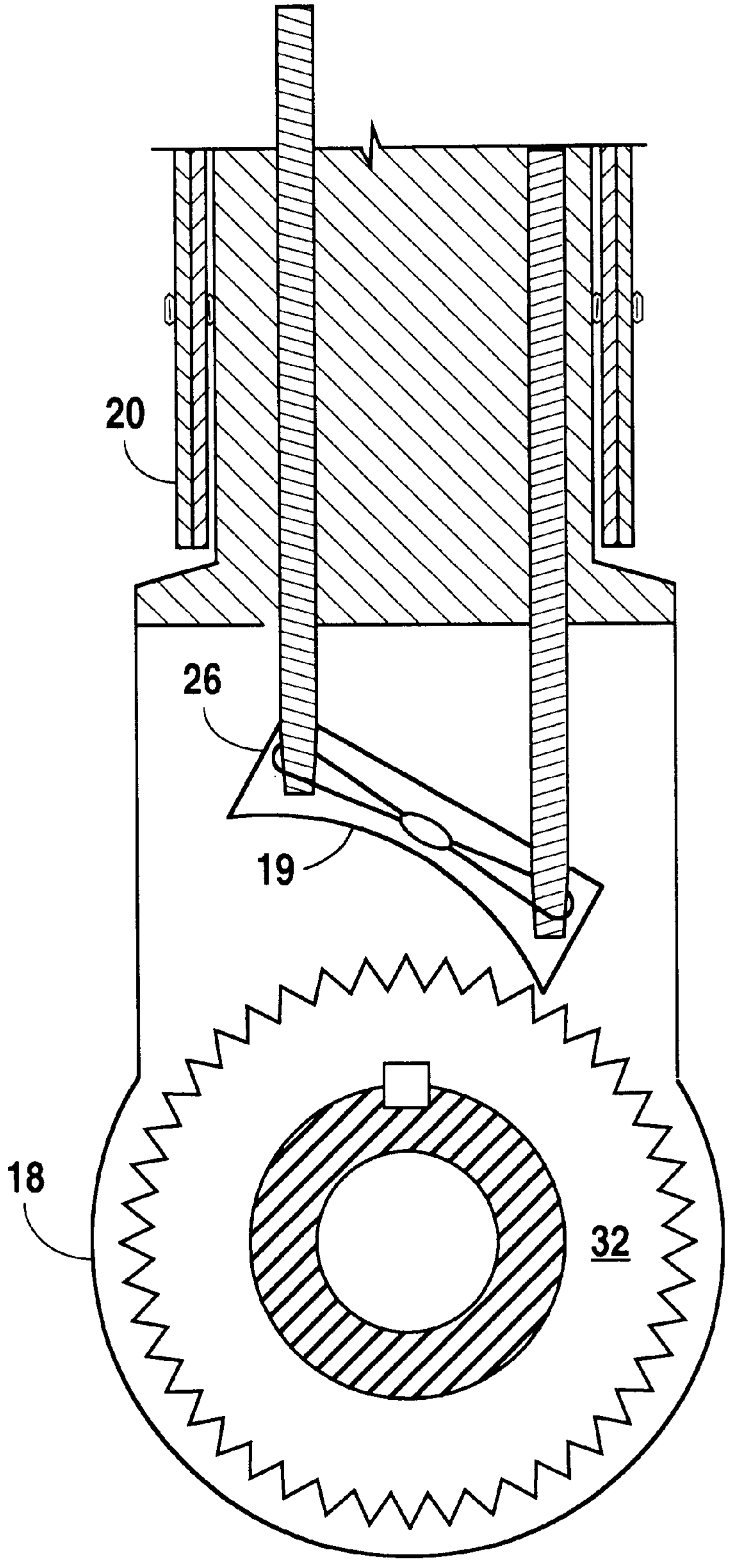
FIG. 7 is a cross section view of the right-side ratchet mechanism showing the ratchet cables attached to the ratchet selector, with the selector set in the reverse position.
Figure 8:
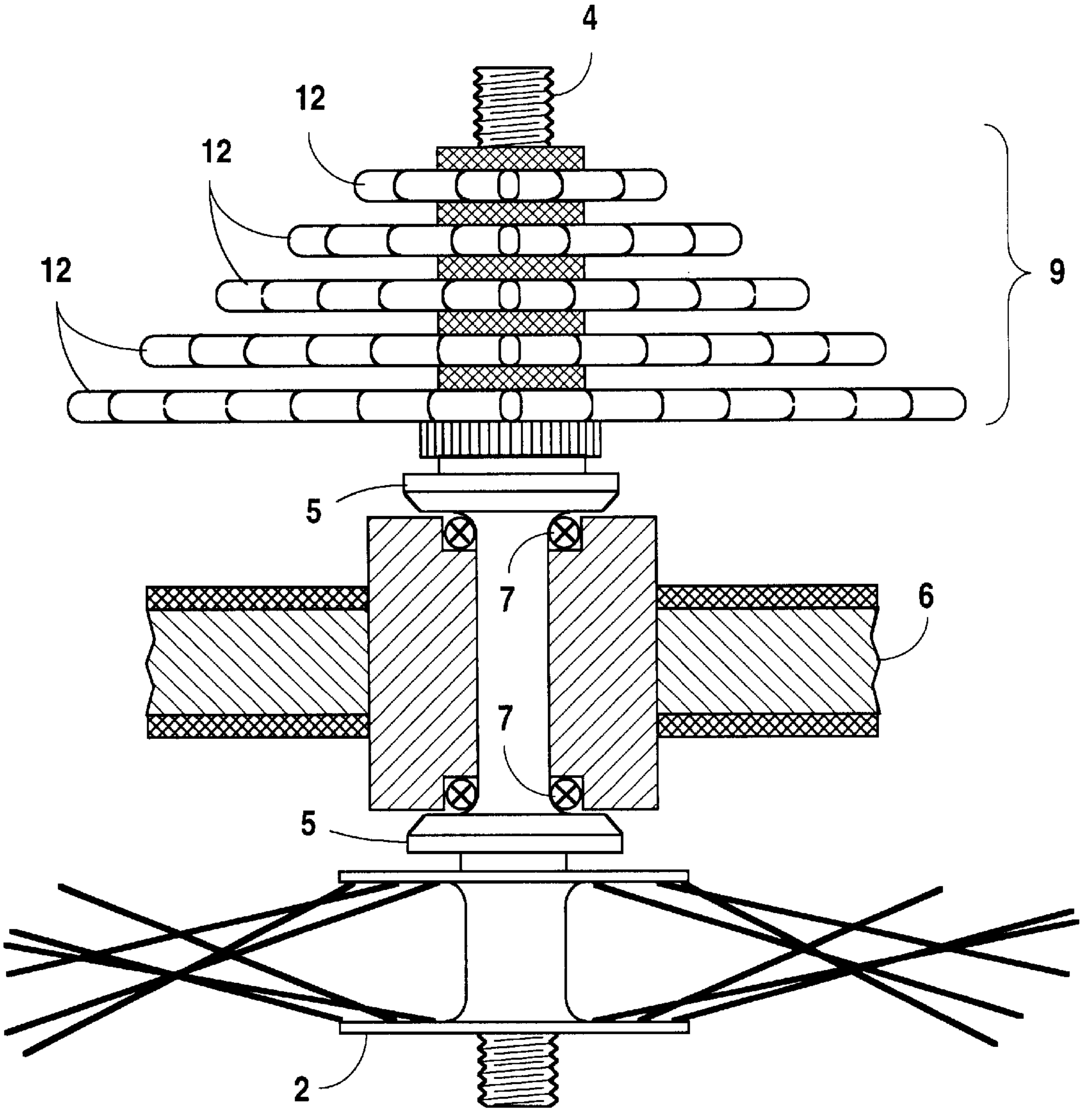
FIG. 8 is a cross section view of the rear axle with its attached gear cluster, bearings, hub, frame upright, and wheel.
Figure 9:
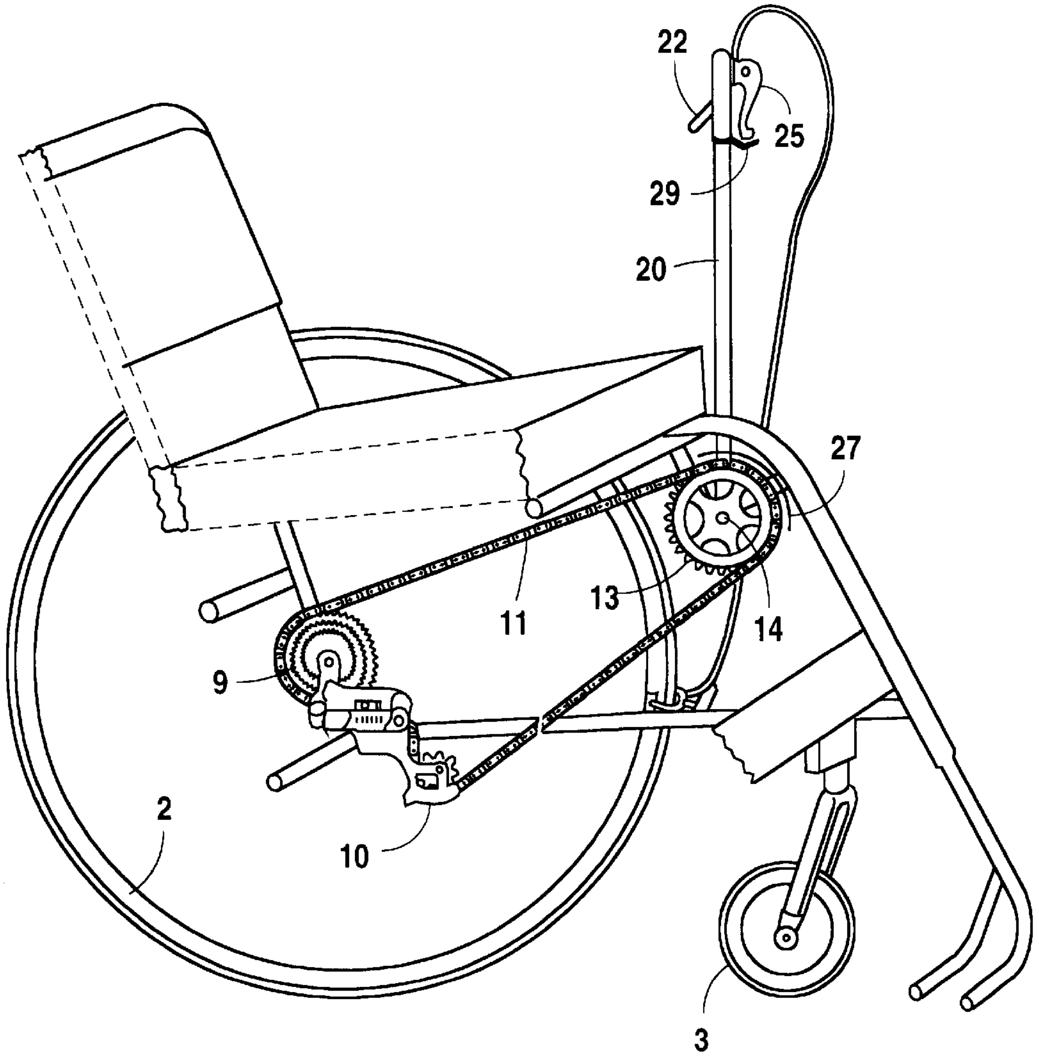
FIG. 9 is a view of the left side of the chair viewed from the center of the chair.
Figure 10:
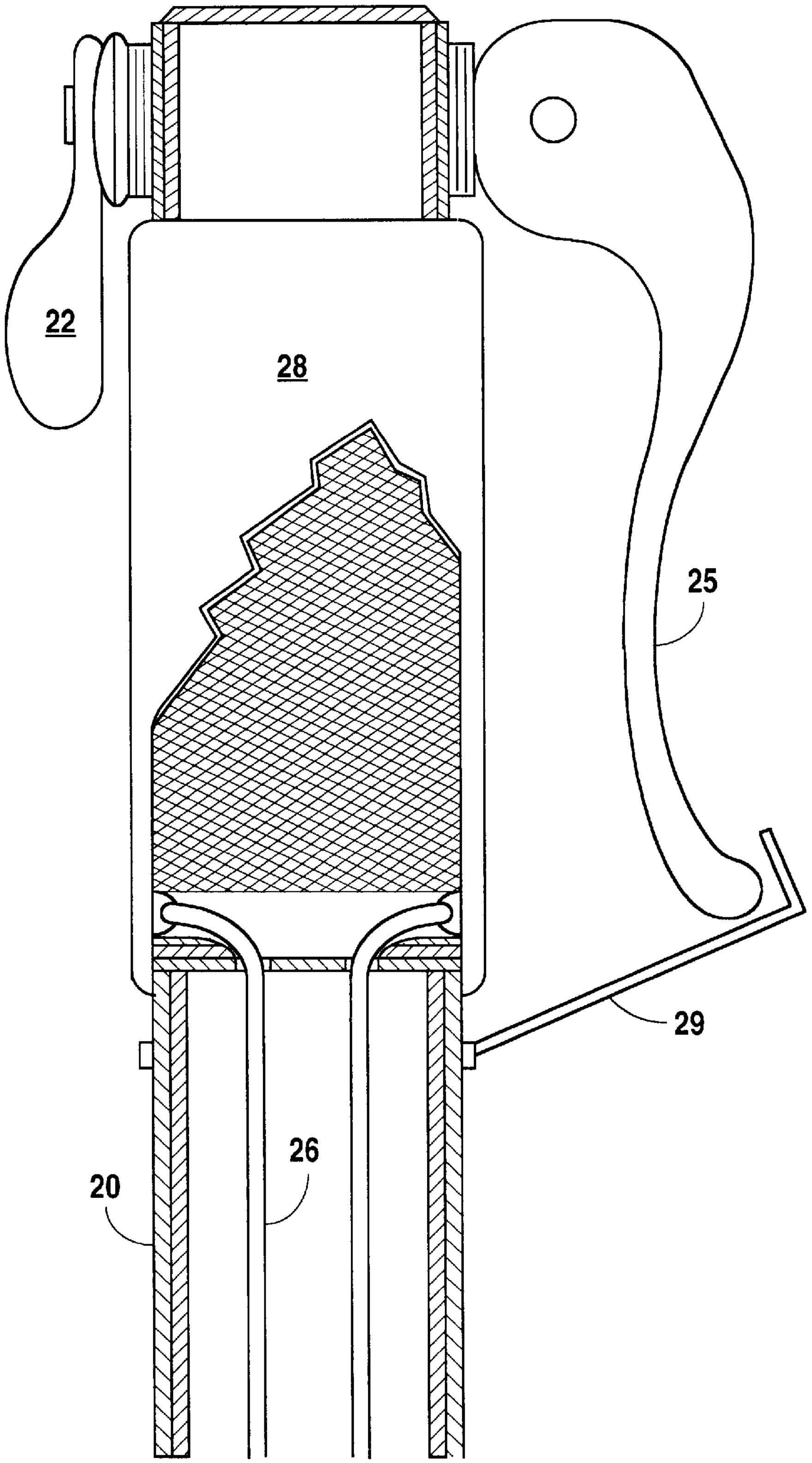
FIG. 10 is a cross section view of the upper end of the push lever showing the shifter, hand brake lever, brake lever retaining clip, ratchet cables, and the rotating hand grip.
Figure 11:
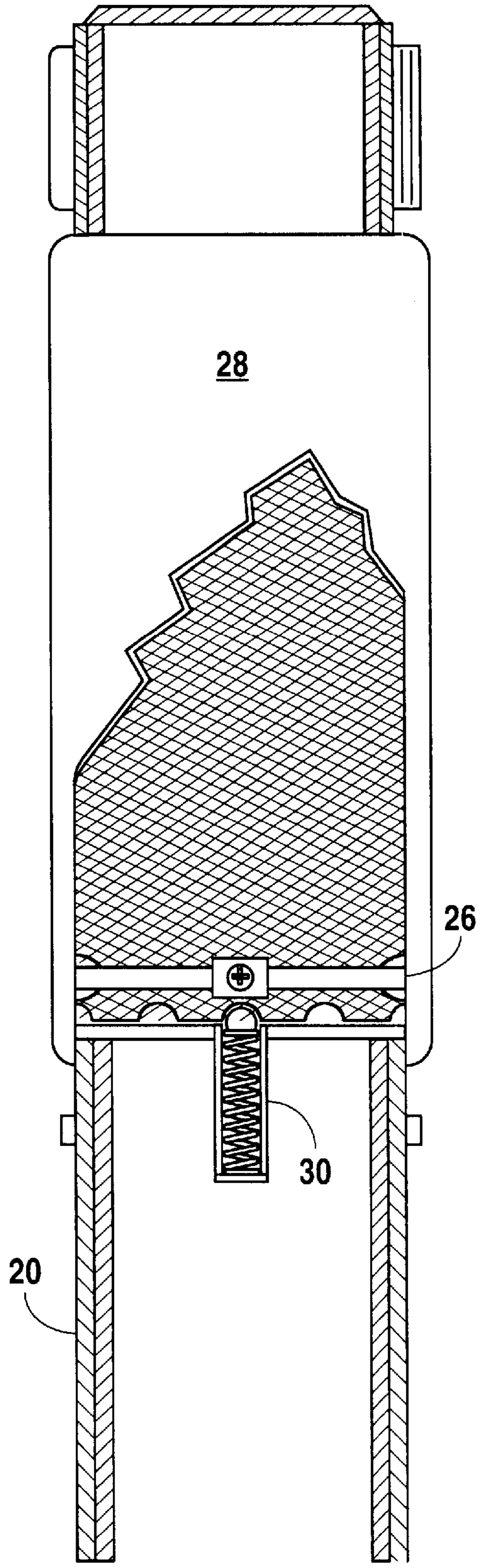
FIG. 11 is a cross section view of the outboard side of the rotating hand grip showing the ratchet cables and the spring-loaded ball set in the neutral detent position of the hand grip.
Figure 12:
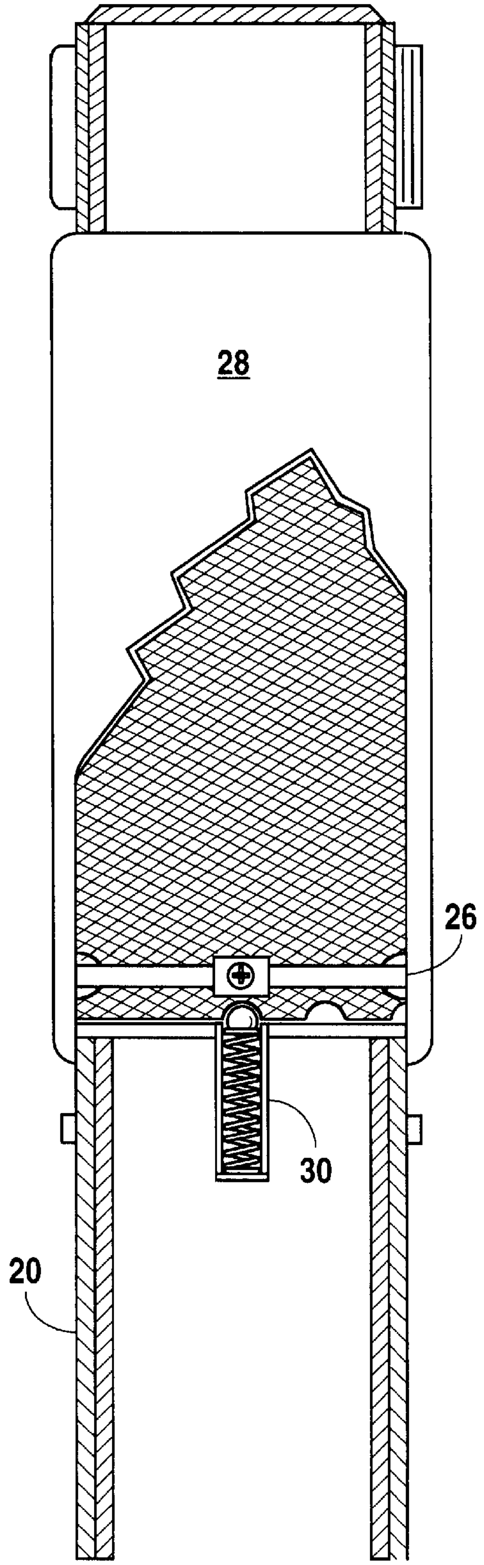
FIG. 12 is a cross section view of the outboard side of the rotating hand grip showing the ratchet cables and the spring-loaded ball set in the forward detent position of the hand grip.
Figure 13:
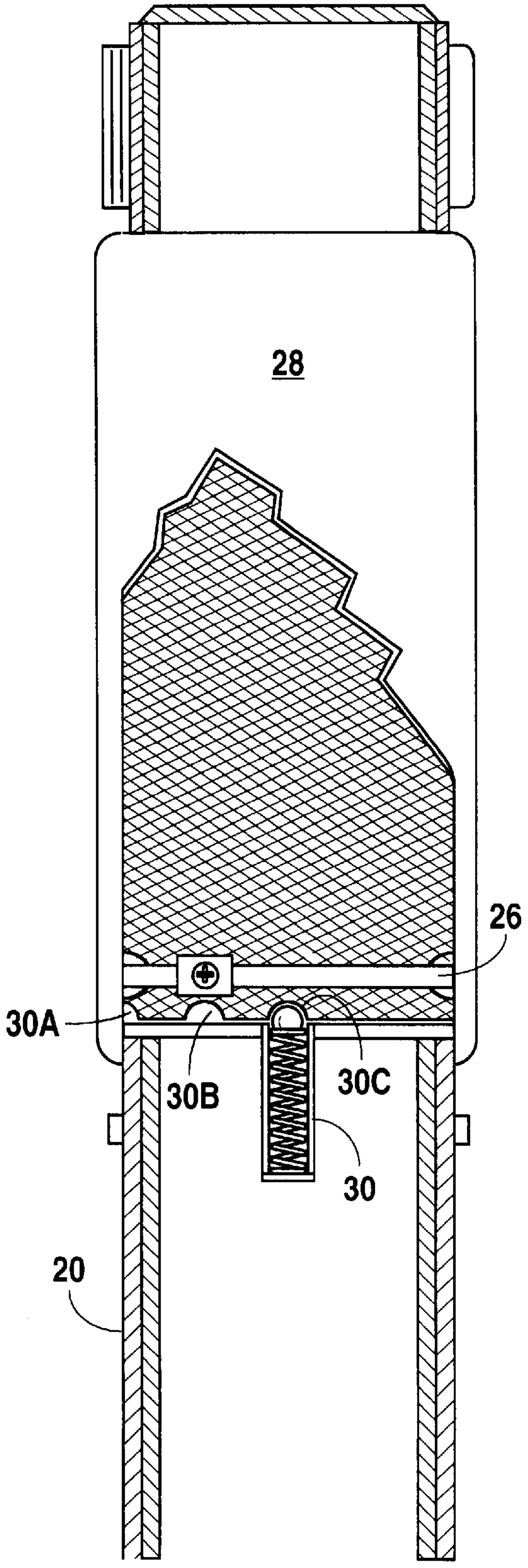
FIG. 13 is a cross section view of the outboard side of the rotating hand grip showing the ratchet cables and the spring-loaded ball set in the reverse detent position of the hand grip.

Additional details of the ratchet selector (19) are seen in FIG. 5, which shows pivoting dog (30) articulating on pin (31) to rotate with respect to the body of the ratchet mechanism and thereby engage the teeth of ratchet gear (32) in the manner set forth in FIGS. 6 and 7. That is, rotation of handle (28) causes a retraction of one of the two cables (26) connected at a first end to the rotating handle and the second end to the pivoting dog, thus causing the dog to pivot.

Terms such as "left," "right," "up," "down," "bottom," "top," "front," "back," "in," "out," and like are applicable to the embodiments shown and described in con-junction with the drawings.

These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A wheelchair having a frame, a seat, a pair of rotatably mounted front wheels, and a pair of rear wheels, the wheelchair including:

two separately operable push-pull levers, each having a near end and a removed end and each rotatably mounted at the removed end to the frame of the wheelchair;

power transmission means operating on each push-pull lever to convert movement of said push-pull levers in one direction to rotary motion;

two drive sprockets for engagement with the power transmission means of each push-pull lever, the drive sprockets rotatably attached to the wheelchair;

a multiplicity of sprocket gears attached to each rear wheel;

two chains for engaging the drive sprockets to the sprocket gears; and two derailers for moving the chains from one of the multiplicity of drive gears to another of the multiplicity of the drive gears.

2. The wheelchair of claim 1, wherein each of said power transmission means further includes a ratchet mechanism engaged to the push-pull lever at the removed end and engaged to the drive sprocket thereof and capable of moving the drive sprocket in a forward rotating or a reverse rotating position and further capable of disengaging from the drive sprocket to a neutral position so that movement of the push-pull lever does not transmit any motion to the drive sprocket.

3. The wheelchair of claim 2, wherein said ratchet mechanism includes a ratchet mechanism control means attached to the near end of said push-pull lever to change said ratchet mechanism.

4. The wheelchair of claim 3 further including a brake and a brake control means on each push-pull lever and further including derailer control means on each rear wheel, wherein said brake control means, derailer control means, and ratchet mechanism control means are located on the near end of the levers such that brake, ratchet and derailer controls can be effected by the user without removing his hands from the push-pull levers.

5. The wheelchair of claim 3, wherein the ratchet mechanism control means includes a rotatable handle to change said ratchet mechanism between forward, neutral, and reverse.

6. The wheelchair of claim 1 further including a pair of independently acting brakes, said pair for operating on the rear wheels, said brakes further including brake control means, the brake control means located on the near end of said push-pull lever.

7. the wheelchair of claim, 6 further including means to retain the brake control means to lock the brakes to the wheels while the operator's hands are removed from the brake control means.

8. The wheelchair of claim 1, wherein each of said derailer includes a derailer control means mounted on the near end of said push-pull lever and further including a cable engaging the derailer control means and the derailer.

9. The wheelchair of claim 1 further including a pair of drive sprocket shields to protect the user's legs.

10. The wheelchair of claim 1 further including a pair of brakes and a pair of brake control means, each brake and brake control means for operating independently on each rear wheel and further including, for each brake control means, a means to lock the rear wheel in a fixed position.

* * * * *